United States Patent
Ahrens et al.

(10) Patent No.: US 6,832,329 B2
(45) Date of Patent: Dec. 14, 2004

(54) CACHE THRESHOLDING METHOD, APPARATUS, AND PROGRAM FOR PREDICTIVE REPORTING OF ARRAY BIT LINE OR DRIVER FAILURES

(75) Inventors: George Henry Ahrens, Pflugerville, TX (US); Alongkorn Kitamorn, Austin, TX (US); Charles Andrew McLaughlin, Round Rock, TX (US); Michael Thomas Vaden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 09/779,365

(22) Filed: Feb. 8, 2001

(65) Prior Publication Data

US 2002/0133760 A1 Sep. 19, 2002

(51) Int. Cl.$^7$ ................................................. G06F 11/00
(52) U.S. Cl. .............................................. 714/5; 714/23
(58) Field of Search ............................... 714/5, 23, 49, 714/48, 30, 42, 57, 53, 54

(56) References Cited

U.S. PATENT DOCUMENTS

| | | | | |
|---|---|---|---|---|
| 5,463,768 A | * | 10/1995 | Cuddihy et al. | ............... 714/37 |
| 5,761,411 A | * | 6/1998 | Teague et al. | ................ 714/47 |
| 5,892,898 A | * | 4/1999 | Fujii et al. | .................... 714/57 |
| 6,345,322 B1 | * | 2/2002 | Humphrey | ................... 710/38 |
| 6,438,716 B1 | * | 8/2002 | Snover | ......................... 714/57 |
| 6,493,656 B1 | * | 12/2002 | Houston et al. | ............ 702/187 |
| 6,647,517 B1 | * | 11/2003 | Dickey et al. | ................ 714/48 |

* cited by examiner

*Primary Examiner*—Scott Baderman
*Assistant Examiner*—Christopher S. McCarthy
(74) *Attorney, Agent, or Firm*—Duke W. Yee; Mark E. McBurney; Gerald H. Glanzman

(57) ABSTRACT

A mechanism is provided for predicting cache array bit line or driver failures. This mechanism checks for five consecutive errors at different addresses within the same syndrome on invocation of event scan polling to characterize the failure. Once the failure is characterized, it is reported to the system for corrective maintenance including dynamic and/or boot time processor deconfiguration or preventive processor replacement.

13 Claims, 3 Drawing Sheets

FIG. 2
200
| PROCESSOR n L2 ERROR TABLE | |
|---|---|
| ADDRESS OF ERROR (202) | CE ERROR FLAG (204) |
| ADDRESS 1 | SYNDROME 1 |
| ADDRESS 2 | SYNDROME 2 |
| ADDRESS 3 | SYNDROME 3 |
| ADDRESS 4 | SYNDROME 4 |
| ADDRESS 5 | SYNDROME 5 |
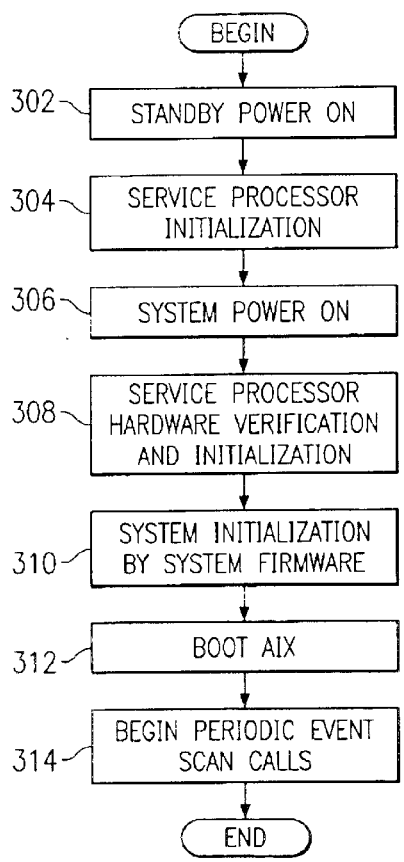
FIG. 3
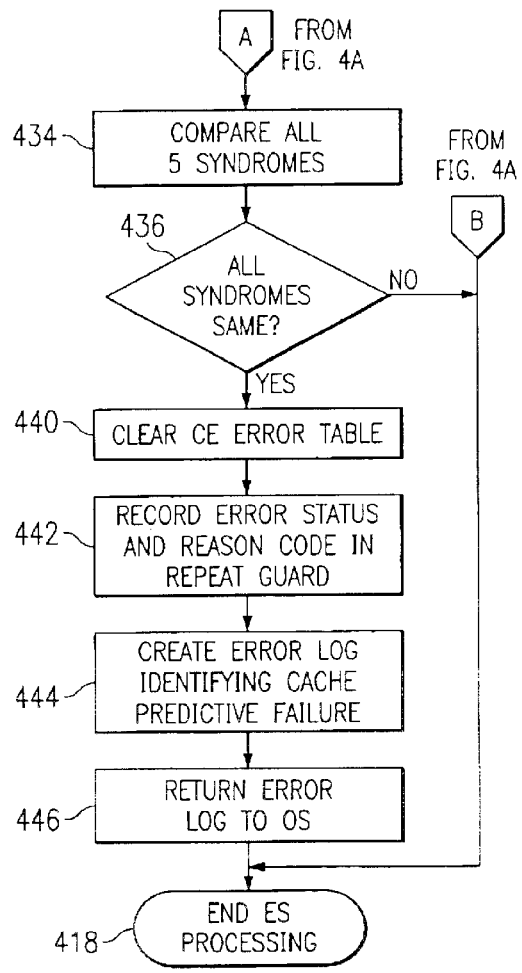
FIG. 4B

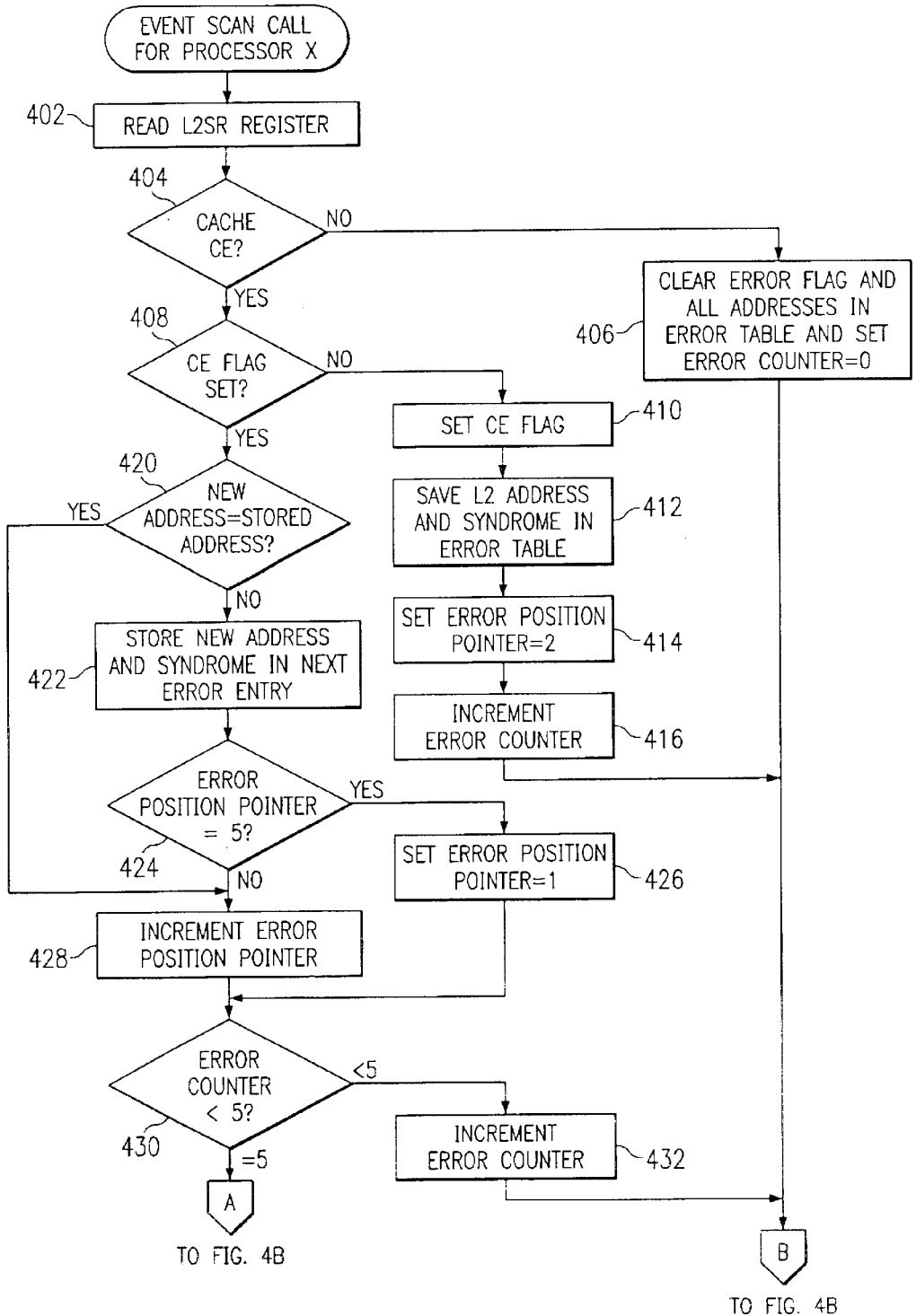

CACHE THRESHOLDING METHOD, APPARATUS, AND PROGRAM FOR PREDICTIVE REPORTING OF ARRAY BIT LINE OR DRIVER FAILURES

BACKGROUND OF THE INVENTION

1. Technical Field

The present invention relates to data processing and, in particular, to error detection and correction. Still more particularly, the present invention provides a method, apparatus, and program for predicting array bit line or driver failures.

2. Description of Related Art

A system may include an event scan that is invoked periodically for each processor in the system. The system may also include error correction circuitry (ECC) to resolve correctable single-bit errors (CE). Some of these correctable errors may be detected in processor caches. A CPU Guard function can be used to dynamically de-allocate a processor and cache that has an error. A Repeat Guard function can be used to de-allocate the resource during boot process to ensure that the cache with the fault does not cause further errors until a customer engineer is able to fix the error. The system may include field replaceable units (FRU), each of which includes a processor and cache. The customer engineer may fix a fault by replacing the FRU.

A cache may have array bit line or driver failures that may cause correctable errors to be detected. Even though these errors are corrected and do not impact continued operation, it is desirable to detect when CEs are repeatedly caused by these types of cache faults. Prior art algorithms attempt to detect array bit line or driver failures by simply counting to some number of faults within a specified time period. Within those algorithms, however, intermittent single-bit errors caused by random noise or other cosmic conditions may result in many false reports of bit line or driver failures.

In addition, some prior algorithms rely on the system rebooting periodically to reset error threshold counters. However, in today's business-critical computing environments, computer systems are not rebooted very often. This may cause random errors to accumulate go and trigger false reports.

Thus, it would be advantageous to provide a cache thresholding method and apparatus for predictive reporting of array bit line or driver failures that does not generate false error reports because of random errors.

SUMMARY OF THE INVENTION

The present invention provides a mechanism for predicting cache array bit line or driver failures, which is faster and more efficient than counting all of the errors associated with a failure. This mechanism checks for five consecutive errors at different addresses within the same syndrome on invocation of periodic polling to characterize the failure. Once the failure is characterized, it is reported to the system for corrective maintenance including dynamic processor deconfiguration or preventive processor replacement.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram of an error table in accordance with a preferred embodiment of the present invention;

FIG. 3 is a flowchart illustrating a system initialization process in accordance with a preferred embodiment of the present invention; and FIGS. 4A and 4B show a flowchart of the operation of the process for predicting bit line or driver failures in accordance with a preferred embodiment of the present invention.

DETAILED DESCRIPTION OF THE PREFERRED EMBODIMENT

Figure 1:
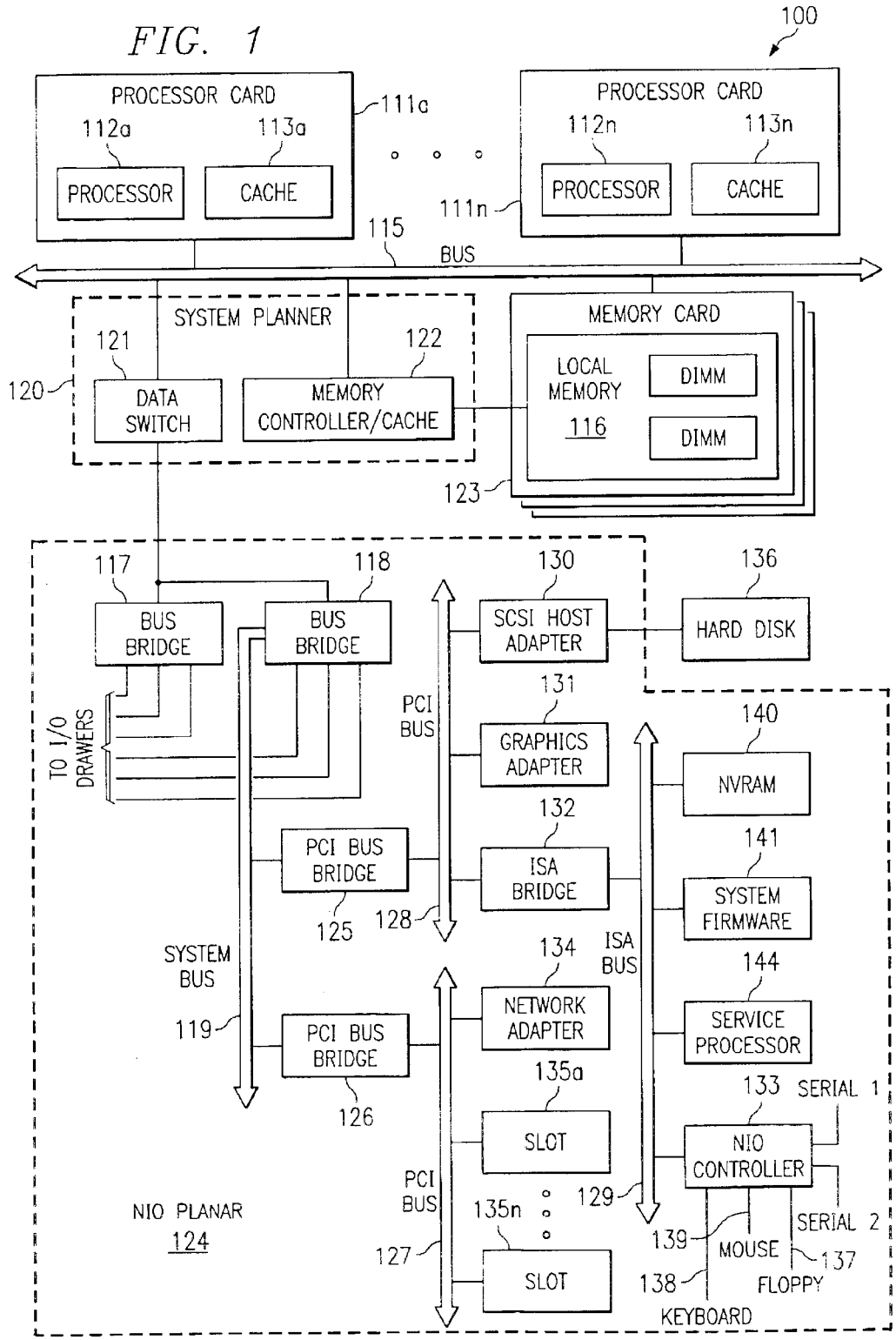
FIG. 1 is a block diagram of an illustrative embodiment of a data processing system with which the present invention may advantageously be utilized.

Referring now to the drawings and in particular to FIG. 1, there is depicted a block diagram of an illustrative embodiment of a data processing system with which the present invention may advantageously be utilized. As shown, data processing system 100 includes processor cards 111a–111n. Each of processor cards 111a–111n includes a processor and a cache memory. For example, processor card 111a contains processor 112a and cache memory 113a, and processor card 111n contains processor 112n and cache memory 113n.

Processor cards 111a–111n are connected to main bus 115. Main bus 115 supports a system planar 120 that contains processor cards 111a–111n and memory cards 123. The system planar also contains data switch 121 and memory controller/cache 122. Memory controller/cache 122 supports memory cards 123 that includes local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a–135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

The preferred embodiment of the present invention, as described below, is implemented within a data processing system 100 in which an event scan is invoked periodically for each processor. The event scan stores an error table, an error position pointer, and an error counter for each processor.

With reference now to FIG. 2, a diagram of an error table is shown in accordance with a preferred embodiment of the present invention. The error table 200 for processor n level two (L2) cache includes a column for the address of the error 202 and a column for the correctable error (CE) flag 204. The CE error flag is set if an error is repeating during error polling period. This is an indication of a solid error. If the error address is unique during each polling period, the error address/syndrome entry is saved in the next error entry. A syndrome is an error signature that describes the error. For example, for a block of sixteen bytes read, the syndrome may identify which bit is bad.

If there are five error entries, all syndromes are checked for error bit alignment. If all five error syndromes are equal, the event scan reports a CE threshold condition. After the fifth error entry is saved and all syndromes are not equal, the next entry restarts at the first error position.

With reference now to FIG. 3, a flowchart is shown illustrating a system initialization process in accordance with a preferred embodiment of the present invention. The process begins and sets standby power on (step 302). The process then performs service processor initialization (step 304) and sets system power on (step 306). Thereafter, the process performs service processor hardware verification and initialization (step 308). System initialization is performed by system firmware (step 310) and the process boots AIX (step 312). During system initialization, tables are cleared and counters are set to zero. Finally, the process begins periodic event scan calls (step 314) and ends.

Turning now to FIGS. 4A and 4B, a flowchart of the operation of the process for predicting bit line or driver failures is shown in accordance with a preferred embodiment of the present invention. Particularly, with respect to FIG. 4A, the process begins with an event scan call for a processor. The process then reads the L2 cache status register (L2SR) (step 402) and a determination is made as to whether a cache CE is detected (step 404). If a cache CE is not detected, the process clears the error flag and all addresses in the error table and sets the error counter to zero (step 406). Then, the process proceeds to step 418 in FIG. 4B to end event scan processing.

If a cache CE is detected in step 404, a determination is made as to whether the CE flag is set (step 408). If the CE flag is not set, the process sets the CE flag (step 410), saves the L2 address and syndrome in the error table (step 412), and sets the error position pointer to two (step 414). Then, the process increments the error counter (step 416) and proceeds to step 418 in FIG. 4B to end event scan processing.

If the CE flag is set in step 408, a determination is made as to whether the new address is equal to the stored address (step 420). If the new address does not equal the stored address, the process stores the new address and syndrome in the next error entry (step 422) and a determination is made as to whether the error position pointer equals five. If the error position pointer equals five, the process sets the error position equal to one (step 426) and proceeds to step 430 to check if error counter is less than five.

If the error position pointer is not equal to five in step 424, the process increments the error position pointer (step 428). Returning to step 420, if the new address equals the stored address, the process proceeds to step 428 to increment the error position pointer. Thereafter, a determination is made as to whether the error counter is less than five (step 430). If the error counter is less than five, the process increments the error counter and proceeds to step 418 in FIG. 4B to end event scan processing.

Turning now to FIG. 4B, if the error counter is not less than five in step 430, then the error counter must be equal to five and the process compares all five syndromes in the error table (step 434) and a determination is made as to whether all syndromes are the same (step 436). If all syndromes are not the same, the process ends event scan processing (step 418). This filters out random single-bit errors.

If all syndromes are the same in step 436, the process clears the CE error table (step 440), records the error status and reason code (step 442), and creates an error log identifying cache predictive failure (step 444). Next, the process returns the error log to the operating system (step 446) and ends event scan processing (step 418).

Thus, the present invention solves the disadvantages of the prior art by filtering out random occurrences of intermittent errors. The present invention reports on bit line or driver faults by insuring that the same syndrome is reported on five different address locations in consecutive checks by the event scan polling code. This reporting eliminates false triggering of predictive maintenance actions which result in either the dynamic de-allocation of the processor module associated with that cache or the unnecessary replacement of the FRU.

The present invention minimizes the risk of uncorrectable errors by invoking dynamic CPU deconfiguration at runtime if enabled, boot-time CPU deconfiguration if enabled for subsequent boots, and preventive FRU replacement. The present invention provides better system availability and performance by not falsely de-allocating or replacing working cache modules. This, in turn, reduces service and warranty costs and increases customer satisfaction.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reporting failures, comprising:
   detecting a predetermined number of consecutive correctable errors;
   storing a description for each of the predetermined number of correctable errors in an error data structure;
   determining whether the descriptions for the predetermined number of correctable errors are the same;
   reporting a bit line or driver failure if the descriptions for the predetermined number of correctable errors are the same; and
   clearing the error data structure if a correctable error is not encountered on an event scan call before detecting the predetermined number of consecutive correctable errors.

2. A method for reporting failures, comprising:
   detecting a predetermined number of consecutive correctable errors;
   storing a description for cash of the predetermined number of correctable errors, wherein each description comprises an address at which an error occurred and an error signature that indicates which bit is bad;
   determining whether the descriptions for the predetermined number of correctable errors are the same; and
   reporting a bit line or driver failure if the descriptions for the predetermined number of correctable errors are the same.

3. A method for reporting failures, comprising:
   detecting a predetermined number of consecutive correctable errors;
   storing a description for each of the predetermined number of correctable errors;
   determining whether the descriptions for the predetermined number of correctable errors are the same;
   reporting a bit line or driver failure if the descriptions for the predetermined number of correctable errors are the same; and
   deconfiguring a processor if the descriptions for the predetermined number of errors are the same.

4. The method of claim 3, wherein the step of deconfiguring the processor comprises dynamically deconfiguring the processor.

5. The method of claim 3, wherein the step of deconfiguring the processor comprises deconfiguring the processor at boot time.

6. A method for reporting failures, comprising:
   detecting a predetermined number of consecutive correctable errors;
   storing a description for each of the predetermined number of correctable errors;
   determining whether the descriptions for the predetermined number of correctable errors are the same;
   reporting a bit line or driver failure if the description, for the predetermined number of correctable errors are the same; and
   replacing a processor if the descriptions for the predetermined number of correctable errors are the same.

7. An apparatus for reporting failures, comprising:
   detection means for detecting a predetermined number of consecutive correctable errors;
   an error data structure for storing a description for each of the predetermined number of correctable errors;
   determination means for determining whether the descriptions for the predetermined number of correctable errors are the same;
   reporting means for reporting a bit line or driver failure if the descriptions for the predetermined number of correctable errors are the same; and
   means for clearing the error data structure if a correctable error is not encountered on an event scan call before detecting the predetermined number of consecutive correctable errors.

8. An apparatus for reporting failures; comprising:
   detection means for detecting a predetermined number of consecutive correctable errors;
   storage means for storing a description for each of the predetermined number of correctable errors, wherein each description comprises an address at which an error occurred and an error signature that indicates which bit is bad;
   determination means for determining whether the descriptions for the predetermined number or correctable errors are the same; and
   reporting means for reporting a bit line or driver failure if the descriptions for the predetermined number of correctable errors are the same.

9. An apparatus for reporting failures, comprising:
   detection means for detecting a predetermined number of consecutive correctable errors;
   storage means for storing a description for each of the predetermined number of correctable errors;
   determination means for determining whether the descriptions for the predetermined number of correctable errors are the same;
   reporting means for reporting a bit line or driver failure if the descriptions for the predetermined number of correctable errors are the same; and
   deconfiguration means for deconfiguring a processor if the descriptions for the predetermined number of errors are the same.

10. The apparatus of claim 9, wherein the deconfiguration means comprises means for dynamically deconfiguring the processor.

11. The apparatus of claim 9, wherein the deconfiguration means comprises means for deconfiguring the processor at boot time.

12. An apparatus for reporting failures, comprising:
    detection means for detecting a predetermined number of consecutive correctable errors;
    storage means for storing a description for each of the predetermined number of correctable errors;
    determination means for determining whether the descriptions for the predetermined number of correctable errors are the same;
    reporting means for reporting a bit line or driver failure if the descriptions for the predetermined number of correctable errors are the same; and
    means for replacing a processor if the descriptions for the predetermined number of correctable errors are the same.

13. An apparatus for reporting failures, comprising:
a processor; and
a memory, coupled to the processor, having stored therein an error data structure,
wherein the processor detects a predetermined number of consecutive correctable errors, stores a description for each of the predetermined number of correctable errors in the error data structure, determines whether the descriptions for the predetermined number of correctable errors are the same, and reports a bit line or driver failure if the descriptions for the predetermined number of correctable errors are the same, wherein each description comprises an address at which an error occurred and an error signature that indicates which bit is bad.

* * * * *

UNITED STATES PATENT AND TRADEMARK OFFICE
CERTIFICATE OF CORRECTION

PATENT NO. : 6,832,329 B2 Page 1 of 1
DATED : December 14, 2004
INVENTOR(S) : Ahrens et al.

It is certified that error appears in the above-identified patent and that said Letters Patent is hereby corrected as shown below:

<u>Column 5,</u>
Line 29, after "for" delete "cash" and insert -- each --.
Line 63, after "if the" delete "description," and insert -- descriptions --.

<u>Column 6,</u>
Line 27, after "number" delete "or" and insert -- of --.

Signed and Sealed this

Twenty-first Day of February, 2006

JON W. DUDAS
*Director of the United States Patent and Trademark Office*